United States Patent
Miao (10) Patent No.: US 7,459,982 B2
(45) Date of Patent: Dec. 2, 2008

(54) EMI REDUCTION STAGE IN A POST-AMPLIFIER

(75) Inventor: Jason Y Miao, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 57 days.

(21) Appl. No.: 11/697,175

(22) Filed: Apr. 5, 2007

(65) Prior Publication Data

US 2008/0074196 A1    Mar. 27, 2008

Related U.S. Application Data

(60) Provisional application No. 60/827,161, filed on Sep. 27, 2006.

(51) Int. Cl.
*H03F 3/08* (2006.01)
(52) U.S. Cl. .................................... 330/308
(58) Field of Classification Search ............... 330/308, 330/250, 207 P
See application file for complete search history.

(56) References Cited

U.S. PATENT DOCUMENTS

| | | | |
|---|---|---|---|
| 6,727,762 B1 * | 4/2004 | Kobayashi | 330/295 |
| 7,253,689 B2 * | 8/2007 | Devendorf et al. | 330/311 |
| 2008/0129380 A1 * | 6/2008 | Jin | 330/250 |

* cited by examiner

*Primary Examiner*—Robert Pascal
*Assistant Examiner*—Hieu P Nguyen
(74) *Attorney, Agent, or Firm*—Workman Nydegger (57) ABSTRACT

An amplifier output stage for reducing Electromagnetic Interference (EMI) that includes an output node and an input node. A first transistor has a base terminal coupled to the input node and has a collector terminal coupled to the output node. A second transistor has a base terminal coupled to an emitter terminal of the first transistor and has a collector terminal coupled to the output node. A third transistor has a collector terminal coupled to the emitter terminal of the first transistor and the base of the second transistor and has an emitter terminal coupled to a current source and to an emitter terminal of the second transistor. A resistor has a first terminal coupled to a base terminal of the third transistor and has a second terminal coupled to the emitter terminal of the first transistor.

24 Claims, 7 Drawing Sheets

EMI REDUCTION STAGE IN A POST-AMPLIFIER

CROSS-REFERENCE TO RELATED APPLICATIONS

This application claims the benefit of U.S. Provisional Application No. 60/827,161, filed Sep. 27, 2006, which is incorporated herein by reference in its entirety.

BACKGROUND

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver.

The operation of an optical transceiver is, however, susceptible to its operating environment. One obvious example of an operating environmental influence is Electro-Magnetic Interference ("EMI"). EMI naturally occurs when the operation of one component causes the unwanted propagation of an electromagnetic field. That electromagnetic field may interfere with the functioning of other proximate electronic components, hence the term "electromagnetic interference". Since the components inside an optical transceiver are always in close proximity to each other, EMI is a major problem in optical transceivers.

Many of the components and/or integrated circuits (IC) in an optical transceiver have a high sensitivity to extraneous analog signals. If these components or ICs encounter any EMI, it can lead to distortion and error in the electric or optical signal that the component or IC produces. For example, if the post-amplifier IC encounters EMI produced by the electro-optic transducer driver, then the post amplifier may incorporate the EMI signal and provide an incorrect signal to other components in the receive path. In addition, the post-amplifier may be damaged by the EMI signals. In like manner, EMI produced by the post-amplifier may distort a signal or cause damage to another component.

EMI can also cause cross talk or unwanted communication between the transmit and receive paths of the optical transceiver. This can result in an incorrect signal being received by the post-amplifier. There may also be cross talk between individual components. In addition, in some cases, EMI can leak back into a component and distort the signal that is being sent. For example, if EMI produced by the electro-optical transducer driver leaked back into the driver, the driver would send an incorrect signal to the optical transmitter.

In many cases, EMI can also cause damage to surrounding circuitry. The EMI signals can often act as radio waves that are transmitted to a wide surrounding area. This can damage other electric circuits that receive the radio waves. This phenomenon is especially problematic in optical transceivers as multiple optical transceivers are often used together within a single host. EMI from any one of the optical transceivers can damage the other optical transceivers or distort the transmit signals of the other optical transceivers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to an amplifier output stage for reducing Electromagnetic Interference (EMI). In one embodiment, the output amplifier stage may include an output node and an input node configured to receive a data signal.

The amplifier output stage also includes a first transistor having a base terminal coupled to the input node and having a collector terminal coupled to the output node. A second transistor has a base terminal coupled to an emitter terminal of the first transistor and has a collector terminal coupled to the output node. A third transistor has a collector terminal coupled to the emitter terminal of the first transistor and the base of the second transistor and has an emitter terminal coupled to a current source and to an emitter terminal of the second transistor.

The amplifier output stage further includes a resistor having a first terminal coupled to a base terminal of the third transistor and a having a second terminal coupled to the emitter terminal of the first transistor, the base terminal of the second transistor and the collector terminal of the third transistor.

In other embodiments, the amplifier output stage may also include an output filter coupled to the output node. Other embodiments may provide additional transistors and resistors for reducing EMI for a differential input signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments disclosed herein relate to an amplifier output stage for reducing Electromagnetic Interference (EMI). In one embodiment, the output amplifier stage may include an output node and an input node configured to receive a data signal.

The amplifier output stage also includes a first transistor having a base terminal coupled to the input node and having a collector terminal coupled to the output node. A second transistor has a base terminal coupled to an emitter terminal of the first transistor and has a collector terminal coupled to the output node. A third transistor has a collector terminal coupled to the emitter terminal of the first transistor and the base of the second transistor and has an emitter terminal coupled to a current source and to an emitter terminal of the second transistor.

The amplifier output stage further includes a resistor having a first terminal coupled to a base terminal of the third transistor and a having a second terminal coupled to the emitter terminal of the first transistor, the base terminal of the second transistor and the collector terminal of the third transistor.

In other embodiments, the amplifier output stage may also include an output filter coupled to the output node. Other embodiments may provide additional transistors and resistors for reducing EMI for a differential input signal.

I. Operating Environment

Figure 1:
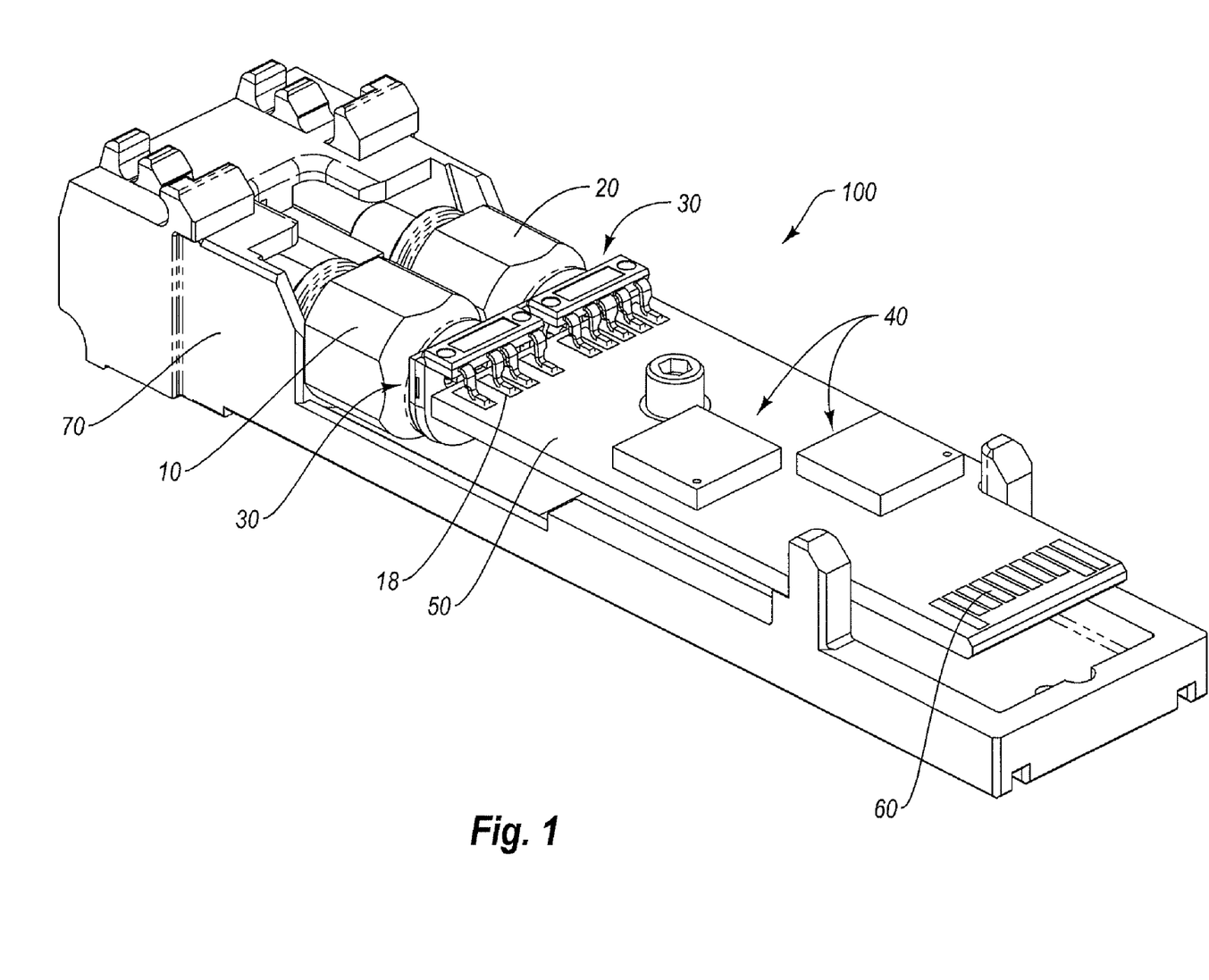
FIG. 1 is a perspective view of an example of an optical transceiver module.

Reference is first made to FIG. 1, which depicts a perspective view of an example optical transceiver module ("transceiver"), generally designated at 100, for use in transmitting and receiving optical signals in connection with an external host that is operatively connected, in one embodiment, to a communications network. As shown, the transceiver shown in FIG. 1 includes various components, including a Receiver Optical Subassembly ("ROSA") 10, a Transmitter Optical Subassembly ("TOSA") 20, electrical interfaces 30, various electronic components 40, such as a laser-driver/post-amplifier and a control module for example, and a printed circuit board 50 which supports the electronic components 40.

In the illustrated embodiment, two electrical interfaces 30 are included in the transceiver 100, one each used to electrically connect the ROSA 10 and the TOSA 20 to a plurality of conductive pads located on the PCB 50. The electronic components 40 are also attached to the PCB 50. An edge connector 60 is located on an end of the PCB 50 to enable the transceiver 100 to electrically and mechanically interface with a host (not shown). In addition, the above-mentioned components of the transceiver 100 are partially housed within a housing 70. Though not shown, some embodiments include a shell that cooperates with the housing 70 to define an enclosure for components of the transceiver 100.

Figure 2:
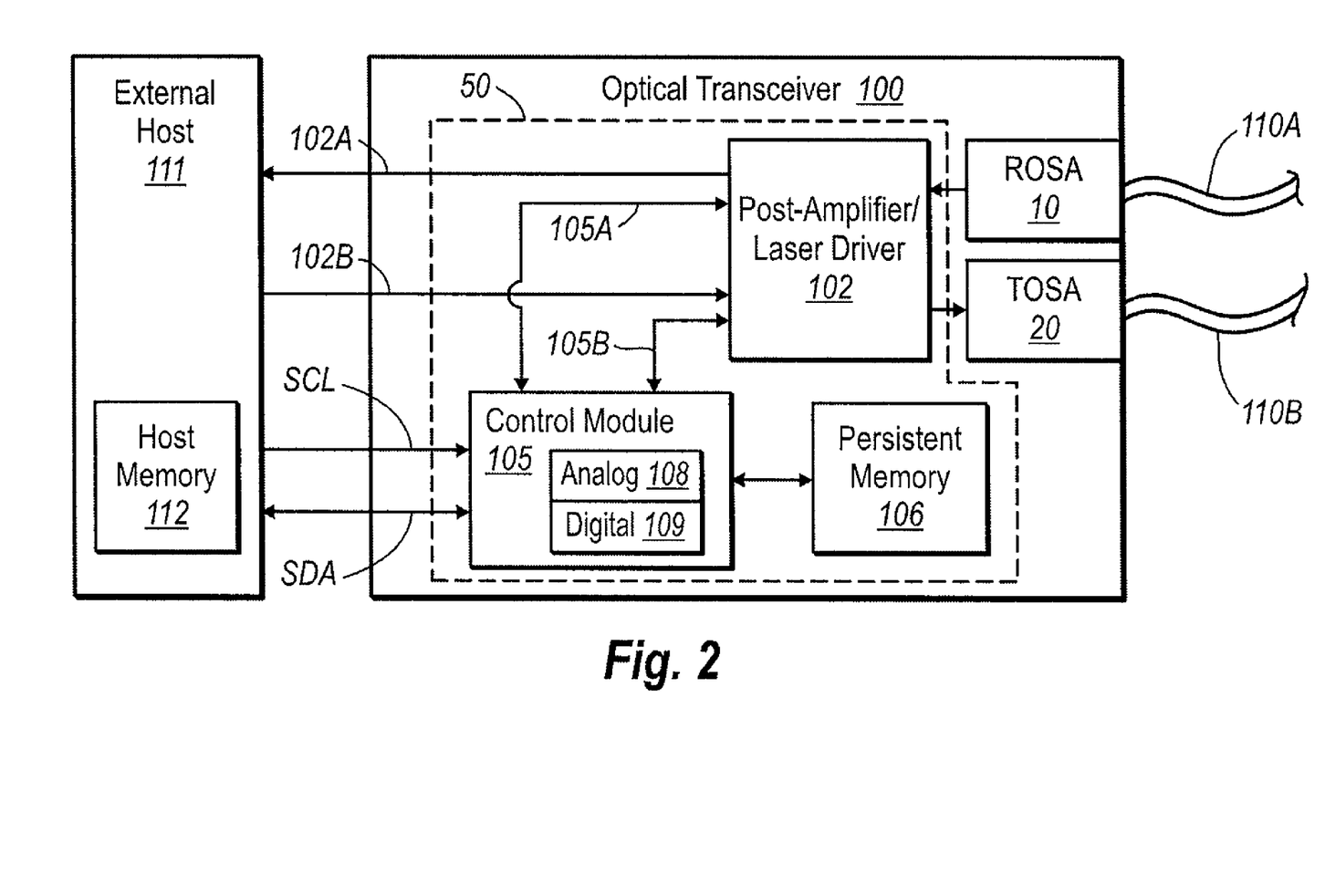
FIG. 2 is a simplified block view showing various aspects of the optical transceiver module of FIG. 1.

Reference is now made to FIG. 2, which is a simplified block diagram of an example of an optical transceiver, denoted at 100 in FIG. 1, depicting various physical and operational aspects of the transceiver. While the optical transceiver 100 will be described in some detail, the optical transceiver 100 is described by way of illustration only, and not by way of restricting the scope of the invention. As mentioned above, the optical transceiver 100 in one embodiment is suitable for optical signal transmission and reception at a variety of per-second data rates, including 1 Gbit/s, 2 Gbit/s, 4 Gbit/s, 8 Gbit/s, 10 Gbit/s, as well as even higher data rates. Furthermore, the embodiments described herein can be implemented in optical transceivers conforming with any of a variety of different form factors, examples of which include, but are not limited to, XFP, SFP, SFP+ and SFF, as well as a variety of different communication protocols, examples of which include, but are not limited to, GiGE, SONET, and Fibre Channel.

With continuing reference to FIG. 2, and with reference as well to FIG. 1, transceiver 100 includes printed circuit board ("PCB") 50 on which the various electronic components of the transceiver are mounted. One such component is a control module 105. Control module 105 is connected to an integrated post-amplifier/laser driver ("PA/LD") 102 by connections 105A and 105B. These connections allow control module 105 to monitor the operation of the post-amplifier/laser driver 102 as will be described in more detail to follow. Control module 105 is connected to a persistent memory 106, which stores microcode for configuring control module 105 and is also used to store operational parameters. The control module 105 is also able to communicate with an external host 111 as depicted by the Serial Data line (SDA) and Serial Clock line (SCL).

Transceiver 100 includes both a transmit path and a receive path, both of which will now be described. The receive path includes ROSA 10, which transforms an incoming optical data signal into an electrical data signal. The electrical data signal is then provided to a post-amplifier portion of PA/LD 102. The post-amplifier amplifies and otherwise processes the electrical data signal and provides the electrical data signal to the external host 111 via connection 102A.

For the transmit path, external host 111 generates an electrical data signal and provides the electrical data signal to a laser driver portion of PA/LD 102 via connection 102B. The laser driver processes the electrical data signal and drives the TOSA 20, which causes the TOSA 20 to emit an optical data signal.

The operation of transceiver 100 will now be described in further detail. In operation, the optical transceiver 100, receives an optical data signal from a fiber 110A via the ROSA 10 in manner to be described more fully below. The ROSA 10 transforms the received optical data signal into an electrical data signal. The ROSA 10 then provides the resulting electrical data signal to a post-amplifier. In the illustrated embodiment, the post amplifier is consolidated with the laser driver as an integrated PA/LD 102. As such, the PA/LD 102 resides on a single integrated circuit chip and is included as a component, together with the other electronic components 40, some of which are further described below, on PCB 50. In other embodiments, the post amplifier and laser driver are implemented as separate components on the PCB 50.

The post-amplifier portion of the PA/LD 102 amplifies the received electrical data signal and provides the amplified data signal to external host 111 over signal path 102A. The external host 111 may be any computing system capable of communicating with the optical transceiver 100. The external host 111 contains a host memory 112 that may be any volatile or non-volatile memory source. In one embodiment, some components of the optical transceiver 100 can reside on the host 111 while the other components of the transceiver reside on the PCB 50 separate from the host 111.

The optical transceiver 100 may also receive electrical data signals from the host 111 for transmission onto a fiber 110B. Specifically, the laser driver portion of the PA/LD 102 receives the electrical data signal from the host 111 via the signal path 102B, and drives a light source within the TOSA 20. One example of a light source is a DML that causes the TOSA 20 to emit onto the fiber 110B optical data signals representative of the information in the electrical data signal provided by the host 111.

The behavior of the ROSA 10, the PA/LD 102, and the TOSA 20 may vary dynamically due to a number of factors. For example, temperature changes, power fluctuations, and feedback conditions may each affect the performance of these components. Accordingly, the transceiver 100 includes a control module 105, which may evaluate environmental conditions, such as temperature, age of the laser, and/or operating conditions, such as voltage, and receive information from the post-amplifier portion of the PA/LD 102 by way of connection 105A, and from the laser driver portion of the PA/LD by way of connection 105B. This arrangement allows the control module 105 to optimize the performance of the laser to compensate for dynamically varying conditions.

Specifically, the control module 105 optimizes the operation of the transceiver 100 by adjusting settings on the PA/LD 102 as represented by the connections 105A and 105B. These settings adjustments can be intermittent and are generally only made when temperature or voltage or other low frequency changes so warrant.

The control module 105 has access to a persistent memory 106, which in one embodiment, is an Electrically Erasable and Programmable Read Only Memory (EEPROM). Persistent memory 106 may also be any other non-volatile memory source. Persistent memory 106 is used to store microcode for configuring control module 105 and for storing operational parameters that have been measured by the control module 105. The persistent memory 106 and the control module 105 may be packaged together in the same package or in different packages without restriction.

Data and clock signals may be provided from the host 111 to the control module 105 using the SDA and SCL lines respectively. Also data may be provided from the control module 105 to the host 111 to allow for transmitting diagnostic data such as environmental and/or operational parameters.

The control module 105 includes both an analog portion 108 and a digital portion 109. In this example, the analog portion 108 and the digital portion 109 collectively enable the control module to implement logic digitally, while still largely interfacing with the rest of the optical transceiver 100 using analog signals.

II. Example Embodiment of a Post-Amplifier

Figure 3:
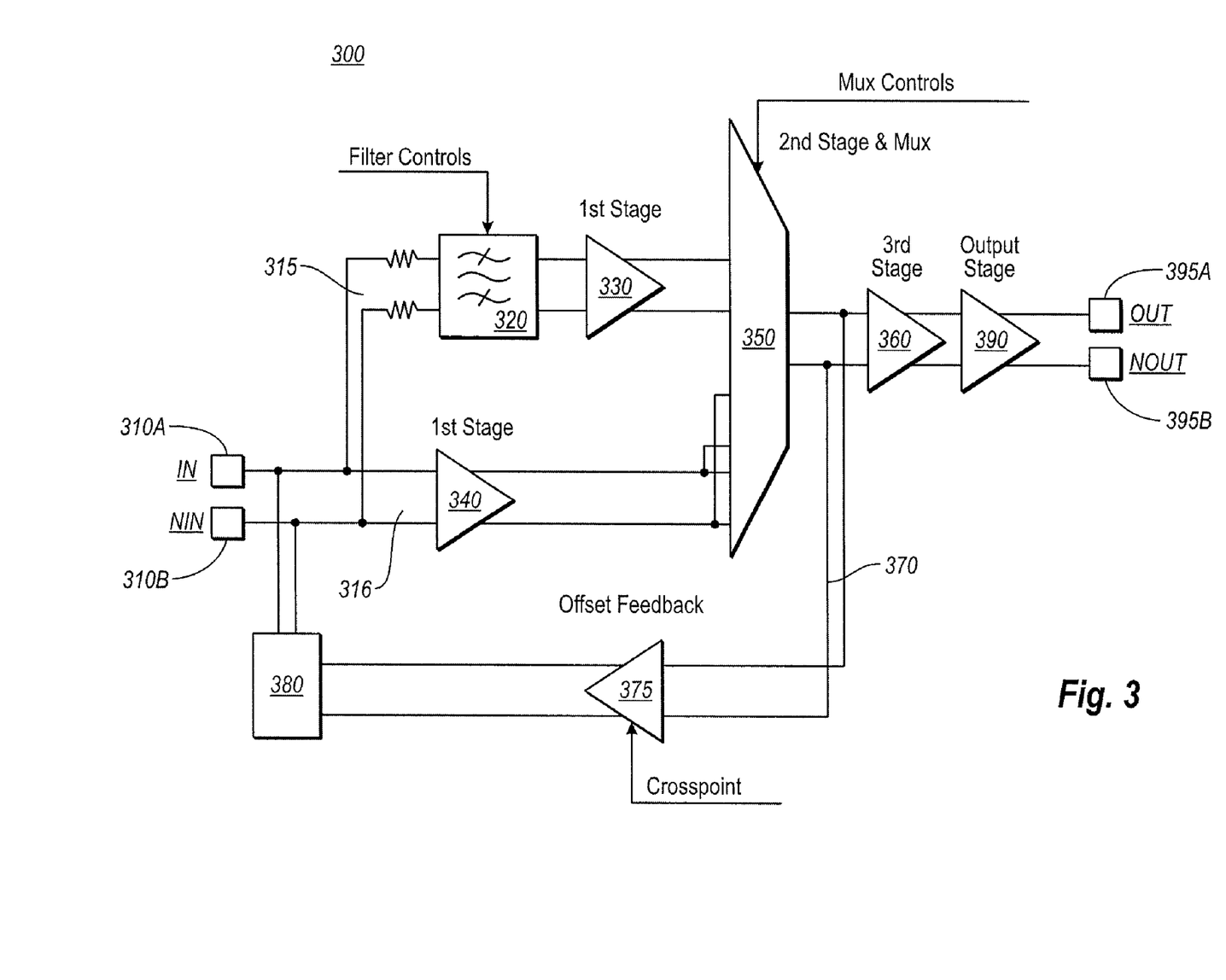
FIG. 3 is a block diagram of an example post-amplifier module of the transceiver of FIG. 2.

Referring now to FIG. 3, a block diagram of an example post-amplifier 300 is shown. The post amplifier 300 may correspond to the post amplifier portion of LD/PA 102 of FIGS. 1 and 2, although this is not required. Note that the following description is for illustration only and should not be used to limit the scope of the appended claims or the embodiments disclosed herein.

Post-amplifier 300 includes a differential input 310A and 310B. The differential input may receive a differential signal from a receiver stage such as ROSA 10 of FIGS. 1 and 2. Specifically, input node 310A receives the positive signal portion and input node 310B receives a complimentary signal portion. As mentioned above, the differential signal received at nodes 310A and 310B may be 1 Gbit/s, 2 Gbit/s, 4 Gbit/s, 10 Gbit/s, as well as even higher data rates. Note that although FIG. 3 and its accompanying description depict the received signal as being differential, the embodiments disclosed herein also apply to a singled ended system.

Post-amplifier 300 further includes a low speed path 315 and a high speed path 316. 1 Gbit/s, 2 Gbit/s, 4 Gbit/s signals are propagated on the low speed path 315 to a filter 320. Filter 320 performs rate selection on the signal. For example, control signals are received that indicate whether a 1 Gbit/s, 2 Gbit/s, or 4 Gbit/s signal should be passed. Any non-selected signals are filtered out.

The filter 320 then provides the selected signal to a low speed path first gain stage 330. The first gain stage 330, which may be comprised of any reasonable components, amplifies the signal. In one embodiment, gain stage 330 is configured to provide 30 dB of gain to the signal.

In like manner, any 10 Gbit/s or higher signals are propagated on the high speed path 316 to a high speed path first gain stage 340, where the signal is amplified. In one embodiment, the gain stage 340, which may also be comprised of any reasonable components, is configured to provide a gain equivalent to the amount provided by gain stage 330.

A second gain stage and multiplexer 350 is then used to select a desired signal and to add additional gain to the signal. For example, second gain stage and multiplexer 350 receives control signals that specify whether to select a signal from low speed path 315 or from high speed path 316. The selected signal is then amplified by second gain stage and multiplexer 350. In one embodiment, second gain stage and multiplexer 350, which may be comprised of any reasonable components, is configured to provide 14 dB of gain to the signal.

Post-amplifier 300 further includes a third gain stage 360. As with the gain stages previously discussed, third gain stage 360 may be implemented with any reasonable components. The third gain stage 360 receives the signal from second gain stage 350 and amplifies the signal. In some embodiments, third gain stage is configured to provide 3 dB of gain to the signal.

The signal is then passed to output stage 390. The differential signal is then provided to output nodes 395A and 395B, where it may be propagated to other components of the optical transceiver 100.

In some embodiments, post-amplifier 300 may include a feedback loop 370. In such embodiments, the signal output from the second gain stage 350 is propagated through the feedback loop 370. The signal passes through gain stage 375, which may be comprised of any reasonable components, where amplification takes place. In some embodiments, cross-point adjustment may occur in gain stage 375. The signal also passes through an offset cancel module 380 that is configured to provide offset cancellation.

Having described an exemplary environment with respect to FIGS. 1, 2 and 3, it will be understood that such environment is only one of countless architectures in which the embodiments described herein may be employed. As previously stated, the embodiments described herein are not intended to be limited to implementation in any particular environment.

III. Example Embodiments of an Output Stage Circuit Configuration

Figure 4:
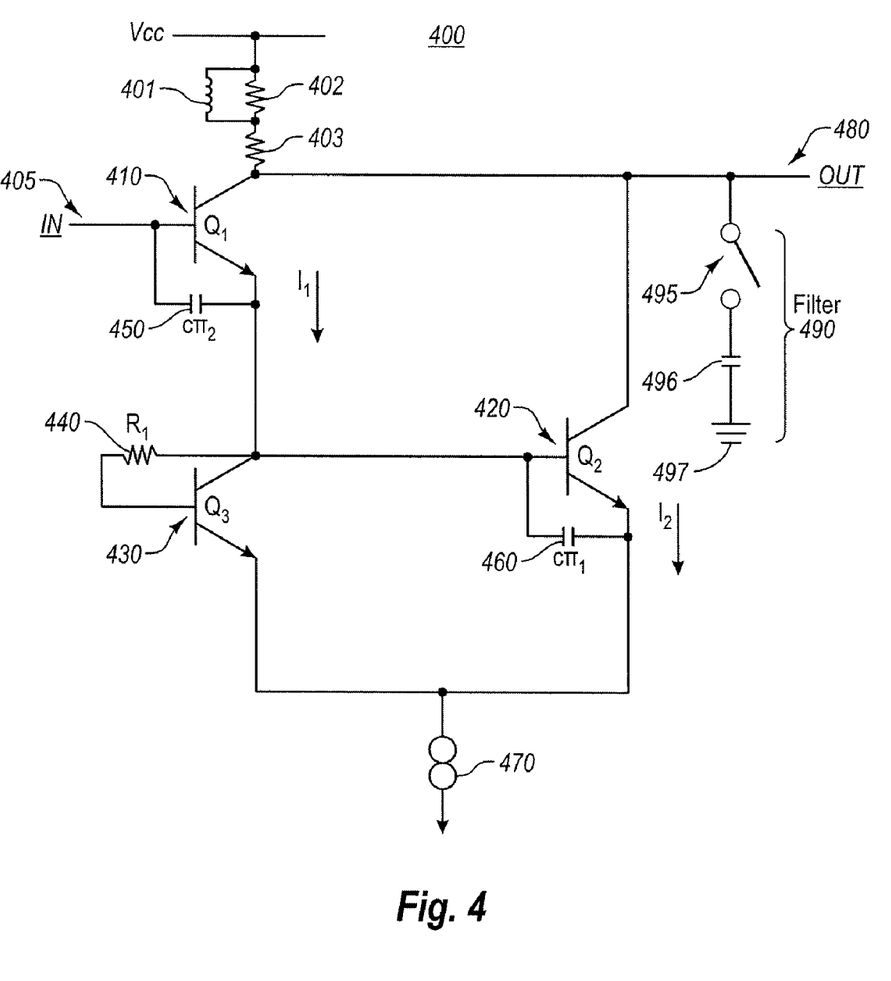
FIG. 4 is circuit diagram of one example embodiment of an output stage of the post-amplifier of FIG. 3.

Referring now to FIG. 4, an example post-amplifier output stage 400 is illustrated. The post-amplifier output stage 400 may correspond to the output stage 390 described in relation to FIG. 3, although this is not required. Note that although various components are illustrated as comprising output stage 400, it should be understood that this is for illustration only. The embodiments disclosed herein contemplate a post-amplifier output stage with additional components not illustrated in FIG. 4. Also note that the reference to a first, second, third, etc. component (such as a transistor) in this description and in the claims is not intended to imply any sequential listing and is merely intended to distinguish one component from another.

The output stage 400 includes an input node 405 that may be coupled to another stage of a post-amplifier, such as third gain stage 360. The input node is configured to receive a data signal from the coupled post-amplifier stage.

The received data signal is provided to a first transistor 410 (also referred to as Q1). Specifically, a base terminal of transistor 410 is coupled to the input node 405. A collector terminal of transistor 410 is coupled to an output node 480, while an emitter of transistor 410 is coupled the collector and base of transistors Q2 and Q3 respectively.

The output node 480, as previously mentioned, has a first node that is coupled to the collector of transistor 410 and to a voltage source VCC through a resistor 403 and an inductor 401 in parallel with a resistor 402, all of which act as a load for output stage 400. The first node of output node 480 is also coupled to a collector terminal of transistor Q2. A second node of output node 480 is provided for communicating the received data signal to other components external to the post-amplifier IC. For example, as described above in relation to FIGS. 1 and 2, data signals may be provided to a host computing system that is coupled to the post-amplifier.

Post-amplifier output stage 400 also includes a second transistor 420 (also referred to as Q2). As mentioned above, the collector terminal of transistor 420 is coupled to the output node 480. In addition, a base terminal of transistor 420 is coupled the emitter terminal of transistor 410 and a collector terminal of transistor 420 is coupled to a current source 470.

A third transistor 430 (also referred to as Q3) is also included in post-amplifier output stage 400. Transistor 430 includes a collector terminal that is coupled to the emitter terminal of transistor 410 and the base terminal of transistor 420. An emitter terminal of transistor 430 is coupled to the emitter terminal of transistor 420 and the current source 470. In operation, the current source 470 is configured to draw current through the transistors Q1, Q2, and Q3.

The base terminal of transistor 430 is coupled to the illustrated left or first terminal of a resistor 440 (also referred to as R1). The illustrated right or second terminal of resistor 440 is coupled to the emitter of transistor 410, the base of transistor 420, and the collector of transistor 430. The resistor 440 is configured to provide a time delay as will be described in more detail to follow.

In some embodiments, post-amplifier output stage 400 may further include an output filter 490 coupled to the output node 480. As will be described in more detail to follow, the output filter 490 may be configured to filter out high frequency signals, thus helping to reduce EMI.

In one example embodiment, output filter 490 may include a switch 495, which may be any reasonable switch, having a first terminal coupled to the output node 480. A second terminal of switch 495 may be coupled to the illustrated top or first terminal of a capacitor 496. The illustrated bottom or second terminal of capacitor 496 may be coupled to a ground 497.

Figure 5:
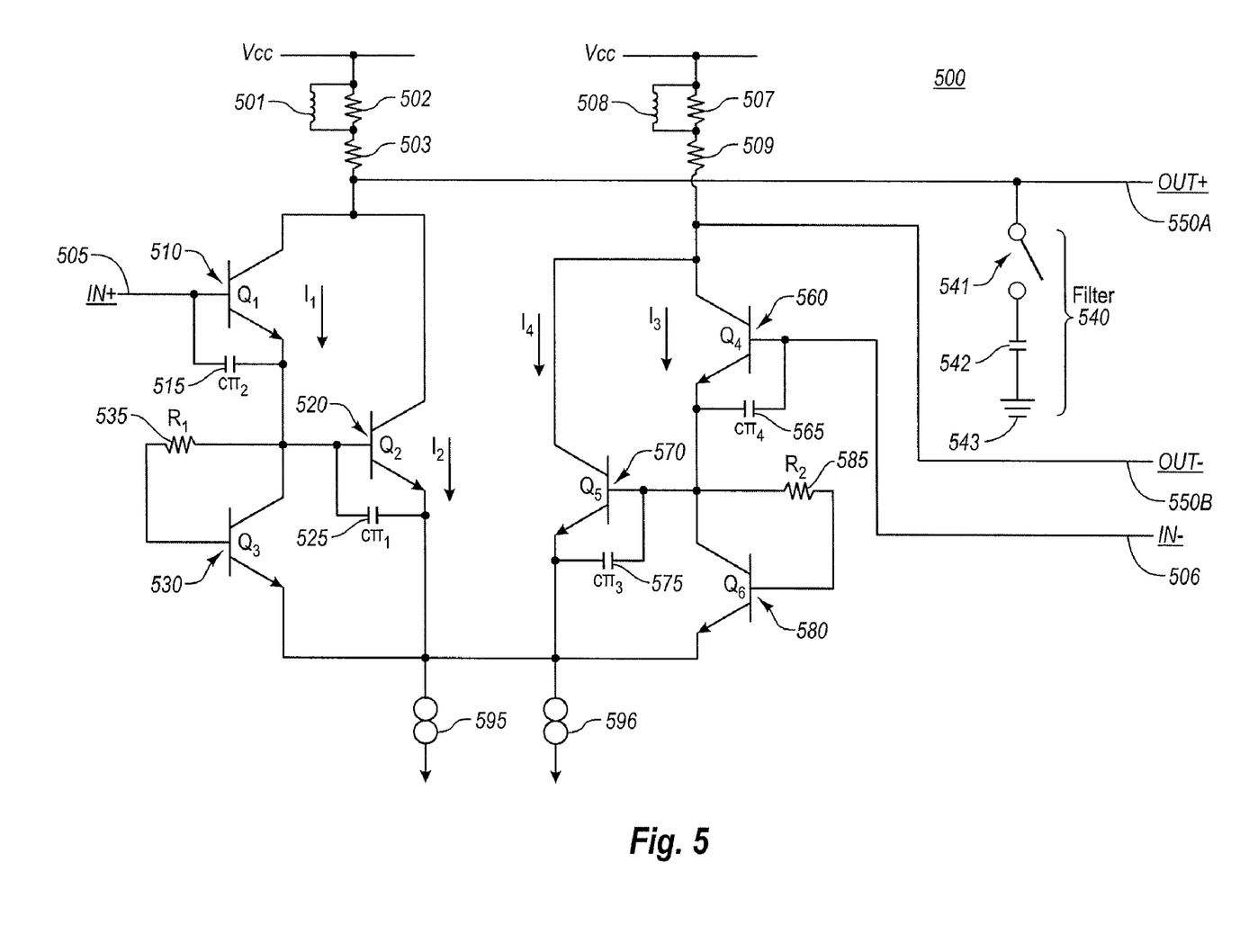
FIG. 5 is circuit diagram of another example embodiment of an output stage of the post-amplifier of FIG. 3.

FIG. 5 illustrates another embodiment 500 of a post-amplifier output stage that may correspond to output stage 390, although this is not required. As with the embodiment described in relation to FIG. 4, the embodiments disclosed herein contemplate additional components for output stage 500 not specifically illustrated in FIG. 5.

The post-amplifier output stage 500 is configured to receive a differential input signal. Specifically, output stage 500 includes an input node 505 for receiving a first data signal and an input node 506 that is configured to receive a second data signal that is complementary to the first data signal. The input nodes 505 and 506 may be coupled to third gain stage 360 of FIG. 3, although this is not required.

The first data signal is provided to a bipolar first transistor 510 (also labeled as Q1). Specifically, a base terminal of transistor 510 is coupled to the input node 505. A collector terminal of transistor 510 is coupled to a first output node 550A, while an emitter of transistor 510 is coupled the collector and base of transistors Q2 and Q3 respectively.

The first output node 550A has a first node that is coupled to the collector of transistor 510 and to a voltage source VCC through a resistor 503 and an inductor 501 in parallel with a resistor 502, all of which act as a load for output stage 500. The first node of the first output node is also coupled to a collector terminal of transistor Q2. A second node of first output node 550A is provided for communicating the first data signal to other components external to post-amplifier output stage 500 such as a host computing system.

Post-amplifier output stage 500 also includes a second transistor 520 (also referred to as Q2). As mentioned above, the collector terminal of transistor 520 is coupled to the output node 550A. In addition, a base terminal of transistor 520 is coupled to the emitter terminal of transistor 510 and a collector terminal of transistor 520 is coupled to a current source 595.

A third transistor 530 (also referred to as Q3) is also included in post-amplifier output stage 500. Transistor 530 includes a collector terminal that is coupled to the emitter terminal of transistor 510 and the base terminal of transistor 520. An emitter terminal of transistor 530 is coupled to the emitter terminal of transistor 520 and the current source 595. In operation, the current source 595 is configured to draw current through the transistors Q1, Q2, and Q3.

The base terminal of transistor 530 is coupled to a first terminal of a first resistor 535 (also referred to as R1). A second terminal of first resistor 535 is coupled to the emitter of transistor 510, the base of transistor 520, and the collector of transistor 530. The first resistor 535 is configured to provide a time delay as will be described in more detail to follow.

The complimentary signal is provided by node 506 to a fourth transistor 560 (also labeled as Q4) that has a base terminal coupled to the input node 506. An emitter terminal of transistor 560 is coupled to an output node 550B, while an emitter of transistor 560 is coupled the collector and base of transistors Q5 and Q6 respectively. The output node 550B is configured to provide the complimentary signal to a host computing system as described above in relation to output 550A. The output node 550B is coupled to the voltage source VCC through a resistor 509 and an inductor 508 in parallel with a resistor 507, all of which act as a load for output stage 500.

A fifth transistor 570 (also referred to as Q5) is also provided. As mentioned, the collector terminal of transistor 570 is coupled to the output node 550B. A base terminal of transistor 570 is coupled the emitter terminal of transistor 560 and a collector terminal of transistor 570 is coupled to a current source 596.

A sixth transistor 580 (also referred to as Q6) is also included in post-amplifier output stage 500. Transistor 580 includes a collector terminal that is coupled to the emitter terminal of transistor 560 and the base terminal of transistor 570. An emitter terminal of transistor 580 is coupled to the emitter terminal of transistor 570 and the current source 596. In operation, the current source 596 is configured to draw current through the transistors Q4, Q5, and Q6.

The base terminal of transistor 580 is coupled to a first terminal of a second resistor 585 (also referred to as R2). A second terminal of second resistor 585 is coupled to the emitter of transistor 560, the base of transistor 570, and the collector of transistor 580. The second resistor 585 is also configured to provide a time delay.

As with output stage 400 described in relation to FIG. 4, in some embodiments output stage 500 may include an output filter 540 coupled to the output of the output stage 500. In one particular embodiment, the output filter 540 may include a switch 541 and a capacitor 542. The switch 541 may be coupled to the output node 550A. A first terminal of the capacitor 542 is coupled to a terminal of the switch while a second terminal of the capacitor 542 is coupled to a ground.

Figure 6:
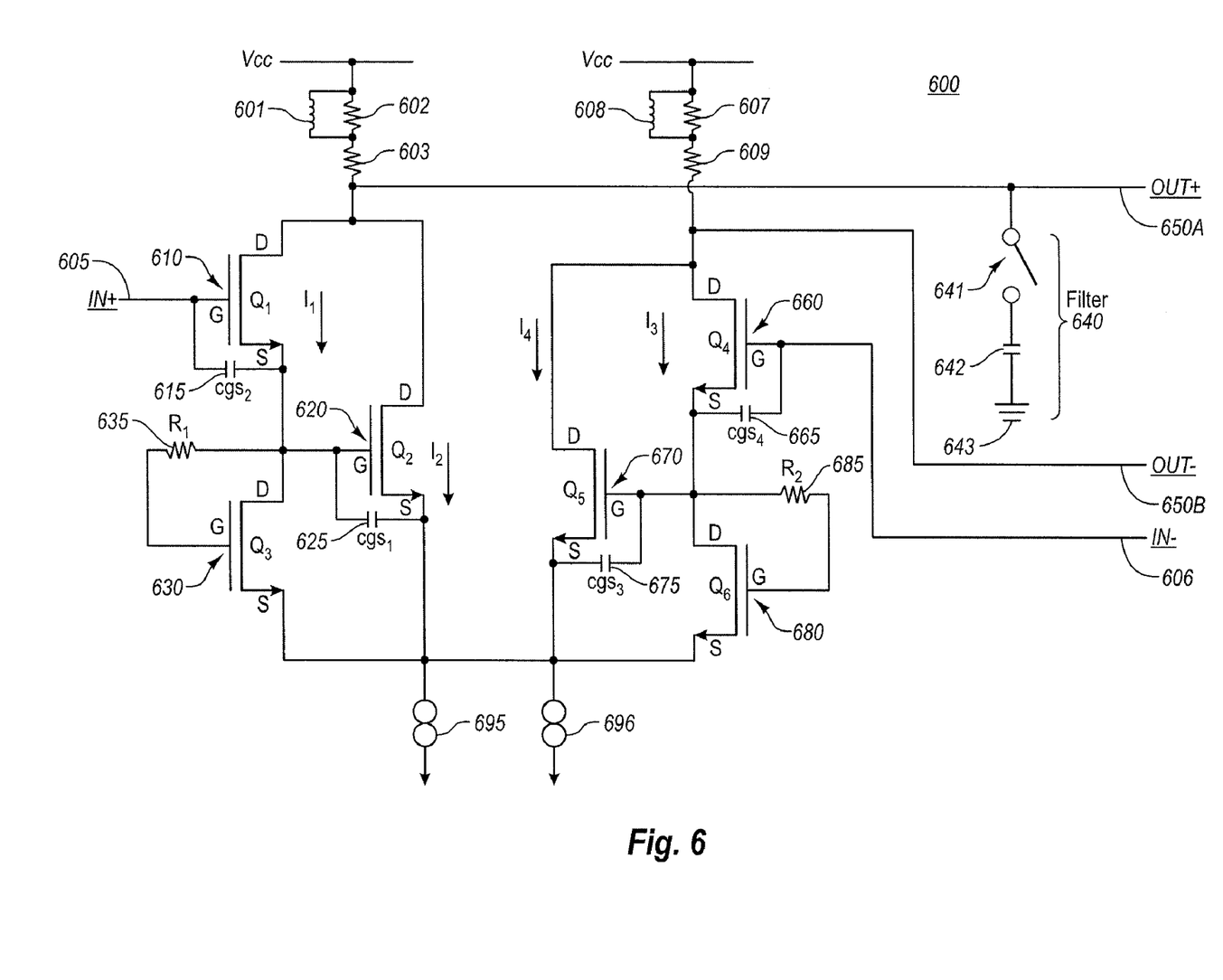
FIG. 6 is circuit diagram of a further example embodiment of an output stage of the post-amplifier of FIG. 3.

FIG. 6 illustrates a further embodiment 600 of a post-amplifier output stage that may correspond to output stage 390, although this is not required. As with the embodiment described in relation to FIGS. 4 and 5, the embodiments disclosed herein contemplate additional components for output stage 600 not specifically illustrated in FIG. 6. The embodiment of FIG. 6 is similar to the embodiment illustrated in FIG. 5 except that the embodiment of FIG. 6 implements Field Effect Transistors (FET).

The post-amplifier output stage 600 is configured to receive a differential input signal. Specifically, output stage 600 includes an input node 605 for receiving a first data signal and an input node 606 that is configured to receive a second data signal that is complementary to the first data signal. The input nodes 605 and 606 may be coupled to third gain stage 360 of FIG. 3, although this is not required.

The first data signal is provided to a first transistor 610 (also labeled as Q1). Specifically, a gate terminal of transistor 610 is coupled to the input node 605. A drain terminal of transistor 610 is coupled to a first output node 650A, while a source of transistor 610 is coupled the drain and gate of transistors Q2 and Q3 respectively.

The first output node 650A has a first node that is coupled to the drain of transistor 610 and to a voltage source VCC through a resistor 603 and an inductor 601 in parallel with a resistor 602, all of which act as a load for output stage 600. The first node of the first output node is also coupled to a drain terminal of transistor Q2. A second node of first output node 650A is provided for communicating the first data signal to other components external to post-amplifier output stage 600 such as a host computing system.

Post-amplifier output stage 600 also includes a second transistor 620 (also referred to as Q2). As mentioned above, the drain terminal of transistor 620 is coupled to the output node 650A. In addition, a gate terminal of transistor 620 is coupled to the source terminal of transistor 610 and a drain terminal of transistor 620 is coupled to a current source 695.

A third transistor 630 (also referred to as Q3) is also included in post-amplifier output stage 600. Transistor 630 includes a drain terminal that is coupled to the source terminal of transistor 610 and the gate terminal of transistor 620. An source terminal of transistor 630 is coupled to the source terminal of transistor 620 and the current source 695. In operation, the current source 695 is configured to draw current through the transistors Q1, Q2, and Q3.

The gate terminal of transistor 630 is coupled to a first terminal of a first resistor 635 (also referred to as R1). A second terminal of first resistor 635 is coupled to the source of transistor 610, the gate of transistor 620, and the drain of transistor 630. The first resistor 635 is configured to provide a time delay as will be described in more detail to follow.

The complimentary signal is provided by node 606 to a fourth transistor 660 (also labeled as Q4) that has a gate terminal coupled to the input node 606. An source terminal of transistor 660 is coupled to an output node 650B, while an source of transistor 660 is coupled the drain and gate of transistors Q5 and Q6 respectively. The output node 650B is configured to provide the complimentary signal to a host computing system as described above in relation to output 650A. The output node 650B is coupled to the voltage source VCC through a resistor 609 and an inductor 608 in parallel with a resistor 607, all of which act as a load for output stage 600.

A fifth transistor 670 (also referred to as Q5) is also provided. As mentioned, the drain terminal of transistor 670 is coupled to the output node 650B. A gate terminal of transistor 670 is coupled the source terminal of transistor 660 and a drain terminal of transistor 670 is coupled to a current source 696.

A sixth transistor 680 (also referred to as Q6) is also included in post-amplifier output stage 600. Transistor 680 includes a drain terminal that is coupled to the source terminal of transistor 660 and the gate terminal of transistor 670. A source terminal of transistor 680 is coupled to the source terminal of transistor 670 and the current source 696. In operation, the current source 696 is configured to draw current through the transistors Q4, Q6, and Q6.

The gate terminal of transistor 680 is coupled to a first terminal of a second resistor 686 (also referred to as R2). A second terminal of second resistor 686 is coupled to the source of transistor 660, the gate of transistor 670, and the drain of transistor 680. The second resistor 686 is also configured to provide a time delay.

As with output stage 400 described in relation to FIG. 4, in some embodiments output stage 600 may include an output filter 640 coupled to the output of the output stage 600. In one particular embodiment, the output filter 640 may include a switch 641 and a capacitor 642. The switch 641 may be coupled to the output node 660A. A first terminal of the capacitor 642 is coupled to a terminal of the switch while a second terminal of the capacitor 642 is coupled to a ground.

IV. Operation of the Embodiments of the Output Stage Configurations

As mentioned previously, extraneous EMI produced by post-amplifier output stage 400, 500, or 600 may cause unwanted results. Advantageously, the circuit configurations described above in relation to FIGS. 4, 5 and 6 are configured to reduce the amount of EMI produced by post-amplifier 300, thus reducing any unwanted results.

Referring again to FIG. 4, a first parasitic capacitance 460 (also referred to $C\pi 1$) is shown between the between the base and emitter terminals of the second transistor 420 and a second parasitic capacitance 460 (also referred to $C\pi 2$) is shown between the base and emitter terminals of the first transistor 410. Note that although the parasitic capacitances are illustrated as being external to the transistors, this for ease of illustration only as it is well known in the art that transistors typically include an internal parasitic capacitance between the base and the emitter.

During operation, an input signal is provided to transistor 410 by input node 406. However, in order for the transistor 410 to begin pulling a current I1, the parasitic capacitance 460 typically should be charged. This is accomplished by driving transistor 410 with the input signal from the previous amplifier stage.

Once transistor 410 is turned on, it will begin to cause a current I1 to be pulled through transistor 430. However, because resistor 440 is coupled to the base and collector of transistor 430, a slight time delay is introduced before transistor 430 turns on. In other words, the resistor 440 causes there to be a slight time delay with respect to transistor 410 for when transistor 430 begins to pull current I1.

Transistor 430 then causes transistor 420 to begin to pull a current I2. However, before current I2 may be pulled through transistor 420, parasitic capacitance 460 must be charged. This charging is done by transistor 410 in a local current loop through transistors 420 and 430. Transistor 420 is thus also slightly delayed in pulling current with respect to transistor 410 due to the effects of resistor 440.

Advantageously, configuring the parasitic capacitance 460 to be charged by the local current loop between transistors 420 and 430 substantially reduces the effects of parasitic capacitance 460 detected at output node 480. In other words, the parasitic capacitive effects of parasitic capacitance 460 are almost wholly contained internally in the post-amplifier 300 IC. The parasitic capacitive effects are thus not transmitted out of post-amplifier 300 by output node 480 as unwanted EMI.

In addition, the parasitic capacitance 460 is reduced as there are three transistors in the output stage. Advantageously, the parasitic capacitive effects of parasitic capacitance 460 are thus reduced at output node 480. This in turn also reduces the unwanted EMI produced by post-amplifier 300.

In some embodiments it is advantageous to have the second transistor 420 be larger than the first transistor 410 as this may improve the EMI reduction in the output stage. For example, in some embodiments transistor 420 may be three times larger than transistor 410. When transistor 420 is larger than transistor 410, the current I2 will also be larger than the current I1, for example three times as large in embodiments where transistor 420 is three times larger than transistor 410. Advantageously, this setup makes the parasitic capacitance 460 larger while decreasing the parasitic capacitance 450. Since the parasitic capacitance 460 is mainly discharged in the internal loop as previously described, making it larger helps decrease the EMI.

As mentioned previously, in some embodiments, output stage 400 may include an output filter 490. The output filter is configured to filter out high frequency signal components present at output node 480. For example, output filter 490 may filter out signal components of 10 GHz or higher. Advantageously this helps to prevent the high frequency signal components from transmitted out of post-amplifier 300 as unwanted EMI.

In those embodiments where the output filter includes the switch 496 and the capacitor 496, the switch 496 is open when there are no high frequency components detected at the output node 480. However, whenever high frequency components are detected, the switch 496 is closed. This results in the high frequency components being shunted to ground 497 through capacitor 496. This process may be repeated as needed.

Referring now to FIG. 5, a first parasitic capacitance 525 (also referred to $C\pi 1$) is shown between the between the base and emitter terminals of the second transistor 520 and a second parasitic capacitance 515 (also referred to $C\pi 2$) is shown between the base and emitter terminals of the first transistor 510. Parasitic capacitances 515 and 525 correspond to parasitic capacitances 450 and 460 of FIG. 4 and thus their operation need not be fully explained again. In particular, parasitic capacitance 525 is charged in a local current loop between transistors 520 and 530 as described above typically resulting in reduced EMI.

Further, as mentioned above, a resistor 535 is coupled to transistor 530. Resistor 535 corresponds to resistor 440 of FIG. 4 and thus causes a delay to currents I1 being drawn by transistor 530 and current I2 being drawn by transistor 520 as described above in relation to FIG. 4.

FIG. 5 further illustrates a third parasitic capacitance 575 (also referred to $C\pi 3$) between the between the base and emitter terminals of the fifth transistor 570 and a fourth parasitic capacitance 565 (also referred to $C\pi 4$) between the base and emitter terminals of the fourth transistor 560.

During operation, a complimentary input signal is provided to transistor 560 by input node 506. However, in order for the transistor 560 to begin pulling a current I3, the parasitic capacitance 565 typically must be charged by driving transistor 560 with the input signal from the previous amplifier stage.

Once transistor 560 is turned on, it will begin to also pull current I3 through transistor 580. However, because resistor 585 is coupled to the base and collector of transistor 580, a slight time delay with respect to transistor 560 is introduced before transistor 580 turns on.

Transistor 580 then causes transistor 570 to begin to pull a current I4. However, before current I4 may be pulled through transistor 570, parasitic capacitance 575 should be charged. This charging is done by a local current loop through transistors 570 and 580. Transistor 570 is thus also slightly delayed in pulling current with respect to transistor 560 due to the effects of resistor 585.

As described above with respect to FIG. 4, charging parasitic capacitance 575 in the local current loop substantially reduces any unwanted EMI effects it may produce. Further, parasitic capacitance 565 is reduced, which in turn may also reduce unwanted EMI. As with the single ended embodiment of FIG. 4, implementing a transistor 570 that is larger than transistor 560, for example three times as large, may help to further reduce unwanted EMI produced by post-amplifier 300.

Referring now to FIG. 6, a first parasitic capacitance 625 (also referred to Cgs1) is shown between the between the gate and source terminals of the second transistor 620 and a second parasitic capacitance 615 (also referred to Cgs2) is shown between the gate and source terminals of the first transistor 610. Parasitic capacitances 615 and 625 correspond to parasitic capacitances 450 and 460 of FIG. 4 and thus their operation need not be fully explained again. In particular, parasitic capacitance 625 is charged in a local current loop between transistors 620 and 630 as described above typically resulting in reduced EMI.

Further, as mentioned above, a resistor 635 is coupled to transistor 630. Resistor 635 corresponds to resistor 440 of FIG. 4 and thus causes a delay to currents I1 being drawn by transistor 630 and current I2 being drawn by transistor 620 as described above in relation to FIG. 4.

FIG. 6 further illustrates a third parasitic capacitance 675 (also referred to Cgs3) between the between the gate and source terminals of the fifth transistor 670 and a fourth parasitic capacitance 665 (also referred to Cgs4) between the gate and source terminals of the fourth transistor 660.

During operation, a complimentary input signal is provided to transistor 660 by input node 606. However, in order for the transistor 660 to begin pulling a current I3, the parasitic capacitance 665 typically must be charged by driving transistor 660 with the input signal from the previous amplifier stage.

Once transistor 660 is turned on, it will begin to also pull current I3 through transistor 680. However, because resistor 685 is coupled to the gate and drain of transistor 680, a slight time delay with respect to transistor 660 is introduced before transistor 680 turns on.

Transistor 680 then causes transistor 670 to begin to pull a current I4. However, before current I4 may be pulled through transistor 670, parasitic capacitance 675 should be charged. This charging is done by a local current loop through transistors 670 and 680. Transistor 670 is thus also slightly delayed in pulling current with respect to transistor 660 due to the effects of resistor 685.

As described above with respect to FIG. 4, charging parasitic capacitance 675 in the local current loop substantially reduces any unwanted EMI effects it may produce. Further, parasitic capacitance 665 is reduced, which in turn may also reduce unwanted EMI. As with the single ended embodiment of FIG. 4, implementing a transistor 670 that is larger than transistor 660, for example three times as large, may help to further reduce unwanted EMI produced by post-amplifier 300.

Figure 7:
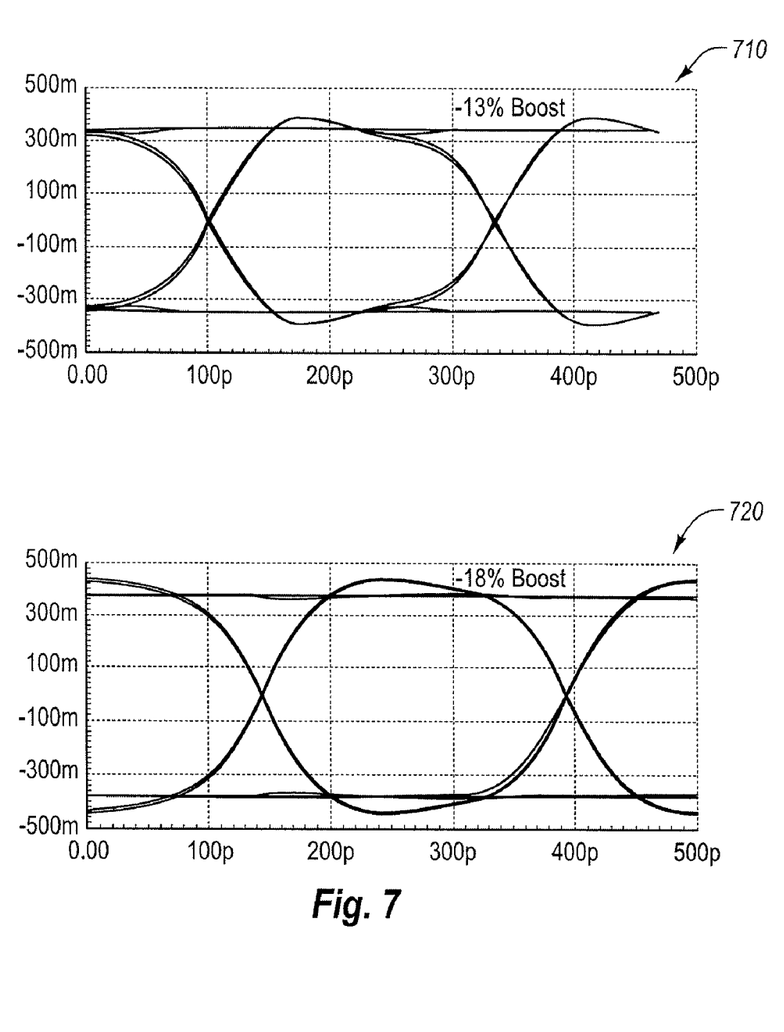
FIG. 7 illustrates waveform shaping performed by the output stage of the post-amplifier.

As mentioned previously, resistors 440, 535, 585, 635 and 685 introduce a short delay in their respective embodiments that helps to reduce EMI. The short delay also helps in wave shaping of the output signal produced by output stage 400, 500 or 600. Referring now to FIG. 7, a plot 710 shows an eye diagram of an output signal from an output stage that does not include the delay caused by resistors 440, 535, 585, 635 and 685. A plot 720, however, shows an eye diagram of an output signal from an output stage that does include the delay caused by at least one of the resistors. As can be seen, the delay adds some overshoot to the signal that helps to round out the shape of the eye. This overshoot may have the effect of pre-compensating for signal attenuation that may occur when the output signal is provided to other components of transceiver 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An amplifier output stage for reducing Electromagnetic Interference (EMI) comprising:
   an output node;
   an input node configured to receive a data signal;
   a first transistor having a base terminal coupled to the input node and having a collector terminal coupled to the output node;
   a second transistor having a base terminal coupled to an emitter terminal of the first transistor and having a collector terminal coupled to the output node;
   a third transistor having a collector terminal coupled to the emitter terminal of the first transistor and the base of the second transistor and having an emitter terminal coupled to a current source and to an emitter terminal of the second transistor; and
   a resistor having a first terminal coupled to a base terminal of the third transistor and a having a second terminal coupled to the emitter terminal of the first transistor, the base terminal of the second transistor and the collector terminal of the third transistor.

2. The amplifier output stage in accordance with claim 1, wherein the resistor is configured to cause a delay in current being drawn by the second and third transistors with respect to current being drawn by the first transistor.

3. The amplifier output stage in accordance with claim 2, wherein the delay caused by the resistor helps to shape the output signal.

4. The amplifier output stage in accordance with claim 2, wherein the delay caused by the resistor pre-compensates for signal attenuation.

5. The amplifier output stage in accordance with claim 1, wherein a first parasitic capacitance between the base and emitter terminals of the second transistor is charged in a local current loop between the second and third transistors such that the effects of the first parasitic capacitance is substantially undetected at the output node.

6. The amplifier output stage in accordance with claim 1, wherein a second parasitic capacitance between the base and emitter terminals of the first transistor is reduced.

7. The amplifier output stage in accordance with claim 1, wherein the second transistor is larger than the first transistor.

8. The amplifier output stage in accordance with claim 7, wherein the second transistor is three times larger than the first transistor.

9. The amplifier output stage in accordance with claim 1, wherein the amplifier output stage is an output stage of a post-amplifier of an optical transceiver.

10. An amplifier output stage for reducing Electromagnetic Interference (EMI) comprising:
    a first output node;
    a first input node configured to receive a first data signal;
    a second output node;
    a second input node configured to receive a second data signal that is complementary to the first data signal;
    a first transistor having a base terminal coupled to the first input node and having a collector terminal coupled to the first output node;
    a second transistor having a base terminal coupled to an emitter terminal of the first transistor and having a collector terminal coupled to the first output node;
    a third transistor having a collector terminal coupled to the emitter terminal of the first transistor and the base of the second transistor and having an emitter terminal coupled to a first current source and to an emitter terminal of the second transistor;

a first resistor having a first terminal coupled to a base terminal of the third transistor and a having a second terminal coupled to the emitter terminal of the first transistor, the base terminal of the second transistor and the collector terminal of the third transistor;

a fourth transistor having a base terminal coupled to the second input node and having a collector terminal coupled to the second output node;

a fifth transistor having a base terminal coupled to an emitter terminal of the fourth transistor and having a collector terminal coupled to the second output node;

a sixth transistor having a collector terminal coupled to the emitter terminal of the fourth transistor and the base of the fifth transistor and having an emitter terminal coupled to a second current source and to an emitter terminal of the fifth transistor; and a second resistor having a first terminal coupled to a base terminal of the sixth transistor and having a second terminal coupled to the emitter terminal of the fourth transistor, the base terminal of the fifth transistor and the collector terminal of the sixth transistor.

11. The amplifier output stage in accordance with claim 10, wherein the first resistor is configured to cause a delay in current being drawn by the second and third transistors with respect to current being drawn by the first transistor and the second resistor is configured to cause a delay in current being drawn by the fifth and sixth transistors with respect to current being drawn by the fourth transistor.

12. The amplifier output stage in accordance with claim 11, wherein the amplifier output stage is an output stage of a post-amplifier of an optical transceiver.

13. The amplifier output stage in accordance with claim 10, wherein a first parasitic capacitance between the base and emitter terminals of the second transistor is charged in a first local current loop between the second and third transistors such that the effects of the first parasitic capacitance is substantially undetected at the first output node and a third parasitic capacitance between the base and emitter terminals of the fifth transistor is charged in a second local current loop between the fifth and sixth transistors such that the effects of the second parasitic capacitance is substantially undetected at the second output node.

14. The amplifier output stage in accordance with claim 10, wherein the second transistor is larger than the first transistor and the fifth transistor is larger than the fourth transistor.

15. The amplifier output stage in accordance with claim 14, wherein the second transistor is three times larger that the first transistor and the fifth transistor is three times larger than the fourth transistor.

16. An amplifier output stage for reducing Electromagnetic Interference (EMI) comprising:

an output node;

an input node configured to receive a data signal;

a first transistor having a base terminal coupled to the input node and having a collector terminal coupled to the output node;

a second transistor having a base terminal coupled to an emitter terminal of the first transistor and having a collector terminal coupled to the output node;

a third transistor having a collector terminal coupled to the emitter terminal of the first transistor and the base of the second transistor and having an emitter terminal coupled to a current source and to an emitter terminal of the second transistor;

a first resistor having a first terminal coupled to a base terminal of the third transistor and a having a second terminal coupled to the emitter terminal of the first transistor, the base terminal of the second transistor and the collector terminal of the third transistor; and an output filter coupled to the output node.

17. The amplifier output stage in accordance with claim 16, wherein the output filter is configured to filter out high frequency signal components to reduce EMI.

18. The amplifier output stage in accordance with claim 17, wherein the output filter filters signal components of 10 GHz and higher.

19. The amplifier output stage in accordance with claim 16, wherein the output filter comprises:

a first switch coupled to the output node; and a first capacitor having a first terminal coupled to the first switch and having a second terminal coupled to a ground, wherein an output signal is shunted to ground by the capacitor whenever the first switch is activated.

20. An amplifier output stage for reducing Electromagnetic Interference (EMI) comprising:

a first output node;

a first input node configured to receive a first data signal;

a second output node;

a second input node configured to receive a second data signal that is complementary to the first data signal;

a first transistor having a gate terminal coupled to the first input node and having a drain terminal coupled to the first output node;

a second transistor having a gate terminal coupled to an source terminal of the first transistor and having a drain terminal coupled to the first output node;

a third transistor having a drain terminal coupled to the source terminal of the first transistor and the gate of the second transistor and having an source terminal coupled to a first current source and to an source terminal of the second transistor;

a first resistor having a first terminal coupled to a gate terminal of the third transistor and a having a second terminal coupled to the source terminal of the first transistor, the gate terminal of the second transistor and the drain terminal of the third transistor;

a fourth transistor having a gate terminal coupled to the second input node and having a drain terminal coupled to the second output node;

a fifth transistor having a gate terminal coupled to an source terminal of the fourth transistor and having a drain terminal coupled to the second output node;

a sixth transistor having a drain terminal coupled to the source terminal of the fourth transistor and the gate of the fifth transistor and having an source terminal coupled to a second current source and to an source terminal of the fifth transistor; and a second resistor having a first terminal coupled to a gate terminal of the sixth transistor and having a second terminal coupled to the source terminal of the fourth transistor, the gate terminal of the fifth transistor and the drain terminal of the sixth transistor.

21. The amplifier output stage in accordance with claim 20, wherein the first resistor is configured to cause a delay in current being drawn by the second and third transistors with respect to current being drawn by the first transistor and the second resistor is configured to cause a delay in current being drawn by the fifth and sixth transistors with respect to current being drawn by the fourth transistor.

22. The amplifier output stage in accordance with claim 20, wherein a first parasitic capacitance between the gate and source terminals of the second transistor is charged in a first local current loop between the second and third transistors such that the effects of the first parasitic capacitance is substantially undetected at the first output node and a third parasitic capacitance between the gate and source terminals of the fifth transistor is charged in a second local current loop between the fifth and sixth transistors such that the effects of the second parasitic capacitance is substantially undetected at the second output node.

23. The amplifier output stage in accordance with claim 20 further comprising:

an output filter coupled to the first output node configured to filter out high frequency signal components to reduce EMI, the output filter comprising:

first switch coupled to the output node; and a first capacitor having a first terminal coupled to the first switch and having a second terminal coupled to a ground, wherein an output signal is shunted to ground by the capacitor whenever the first switch is activated.

24. The amplifier output stage in accordance with claim 20, wherein the amplifier output stage is an output stage of a post-amplifier of an optical transceiver.

* * * * *

UNITED STATES PATENT AND TRADEMARK OFFICE
CERTIFICATE OF CORRECTION

| | | |
|---|---|---|
| PATENT NO. | : 7,459,982 B2 | |
| APPLICATION NO. | : 11/697175 | |
| DATED | : December 2, 2008 | |
| INVENTOR(S) | : Miao | |

It is certified that error appears in the above-identified patent and that said Letters Patent is hereby corrected as shown below:

Column 4
Line 11, change "pads" to --pads 18--

Column 5
Line 4, change "in manner" to --in a manner--
Line 43, change "PA/LD" to --PA/LD 102--

Column 6
Line 12, change "LD/PA 102" to --PA/LD 102--
Line 17, after "includes", remove [a]
Line 17, change "input 310A" to --input nodes 310A--

Column 7
Line 9, after "such", add --an--
Line 58, after "coupled" add --to--

Column 9
Lines 10-11, change "output 550A." to --output node 550A.--
Line 42, change "ground." to --ground 543.--

Column 10
Line 30, change "while an" to --while a--
Lines 34-35, change "output 650A." to --output node 650A.--
Lines 55-58, change all instances of "686" to --685--
Line 65, change "660A." to --650A.--
Line 66, change "switch" to --switch 641--
Line 67, change "ground." to --ground 643.--

Signed and Sealed this
First Day of March, 2011

David J. Kappos
*Director of the United States Patent and Trademark Office*

Column 11
Line 13, change "460" to --450--
Line 21, change "406" to --405--

Column 12
Line 7, change "transmitted" to --transmitting--
Lines 10 and 13, change all instances of "switch 496" to --switch 495--
Line 33, after "between the" remove [between the]

Column 14
Line 18, change "and a having" to --and having--

Column 15
Line 2, change "and a having" to --and having--
Line 47, change "larger that" to --larger than--
Line 66, change "and a having" to --and having--

Column 16
Lines 27-28, 32, 33, 43, 48, 49, change all instances of "an source" to --a source--
Line 36, change "and a having" to --and having--